United States Patent
Akagi et al.

(10) Patent No.: US 9,964,055 B2
(45) Date of Patent: May 8, 2018

(54) CONTROL DEVICE AND CONTROL METHOD OF INTERNAL COMBUSTION ENGINE

(71) Applicant: NISSAN MOTOR CO., LTD., Yokohama-shi, Kanagawa (JP)

(72) Inventors: Mitsuhiro Akagi, Hiratsuka (JP); Hirofumi Tsuchida, Tokosuka (JP); Ayumi Komiya, Isehara (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days. days.

(21) Appl. No.: 14/414,980

(22) PCT Filed: Jun. 10, 2013

(86) PCT No.: PCT/JP2013/065992
§ 371 (c)(1),
(2) Date: Jan. 15, 2015

(87) PCT Pub. No.: WO2014/017189
PCT Pub. Date: Jan. 30, 2014

(65) Prior Publication Data
US 2015/0192079 A1    Jul. 9, 2015

(30) Foreign Application Priority Data

Jul. 25, 2012 (JP) ................. 2012-164252

(51) Int. Cl.
*F02D 41/00* (2006.01)
*F02D 23/00* (2006.01)
(Continued)

(52) U.S. Cl.
CPC ........ *F02D 41/0052* (2013.01); *F01L 1/3442* (2013.01); *F02D 13/0215* (2013.01);
(Continued)

(58) Field of Classification Search
CPC .. F02D 41/0052; F02D 23/00; F02D 13/0215; F02D 13/0261; F02D 41/0062;
(Continued)

(56) References Cited

U.S. PATENT DOCUMENTS

2007/0089697 A1* 4/2007 Hara ............. F02D 35/023
123/90.15
2008/0022677 A1* 1/2008 Barbe ............. F02M 26/47
60/599

(Continued)

FOREIGN PATENT DOCUMENTS

EP    2 256 323 A2    12/2010
JP    H08-158954 A    6/1996
(Continued)

*Primary Examiner* — Jason T Newton
(74) *Attorney, Agent, or Firm* — Drinker Biddle & Reath LLP

(57) ABSTRACT

In a case where a driving state is switched from a high load to a low load in a non-turbo charge region and an external EGR is stopped, at a timing T01 at which an EGR control valve (21) is closed, a valve overlap quantity between an intake valve and an exhaust valve is, as a low load transient time provisional value, controlled in a direction such that the valve overlap between the intake and exhaust valves is once contracted. Then, a target value of the valve overlap quantity between the intake and exhaust valves at a timing T21 preceded by a response time Δt of the variably operated valve mechanism (28) from a timing T31 at which the opening angle of the EGR control valve (21) is modified from the low load transient time provisional value to the target value at the time of the low load.

12 Claims, 4 Drawing Sheets

(51) Int. Cl.
<table>
<tr><td>F02D 13/02</td><td>(2006.01)</td></tr>
<tr><td>F02D 21/08</td><td>(2006.01)</td></tr>
<tr><td>F01L 1/344</td><td>(2006.01)</td></tr>
<tr><td>F02M 26/06</td><td>(2016.01)</td></tr>
<tr><td>F02M 26/01</td><td>(2016.01)</td></tr>
<tr><td>F02B 29/04</td><td>(2006.01)</td></tr>
<tr><td>F02B 37/16</td><td>(2006.01)</td></tr>
<tr><td>F02B 37/18</td><td>(2006.01)</td></tr>
<tr><td>F02M 26/10</td><td>(2016.01)</td></tr>
<tr><td>F02M 26/15</td><td>(2016.01)</td></tr>
<tr><td>F02M 26/23</td><td>(2016.01)</td></tr>
</table>

(52) U.S. Cl.
CPC ......... *F02D 13/0261* (2013.01); *F02D 21/08* (2013.01); *F02D 23/00* (2013.01); *F02D 41/006* (2013.01); *F02D 41/0007* (2013.01); *F02D 41/0062* (2013.01); *F02D 41/0072* (2013.01); *F02M 26/01* (2016.02); *F02M 26/06* (2016.02); *F02B 29/0406* (2013.01); *F02B 37/16* (2013.01); *F02B 37/18* (2013.01); *F02D 2041/001* (2013.01); *F02M 26/10* (2016.02); *F02M 26/15* (2016.02); *F02M 26/23* (2016.02); *Y02T 10/144* (2013.01); *Y02T 10/18* (2013.01); *Y02T 10/47* (2013.01)

(58) Field of Classification Search
CPC .. F02D 41/0072; F02D 21/08; F02D 41/0007; F02D 2041/001; F02M 25/0709; F02M 25/0752; F02M 25/0706; F02M 25/072; F02M 25/0713; F02M 25/0718; F02M 25/0727; F01L 1/3442; F02B 29/0406; F02B 37/18; Y02T 10/18; Y02T 10/144; Y02T 10/47

USPC .................................. 60/605.2, 605.3, 605.5
See application file for complete search history.

(56) References Cited

U.S. PATENT DOCUMENTS

<table>
<tr><td>2009/0145380 A1*</td><td>6/2009</td><td>Wada ..................... F01L 1/022<br>123/90.12</td></tr>
<tr><td>2010/0077990 A1*</td><td>4/2010</td><td>Shishime ............ F02D 13/0261<br>123/299</td></tr>
<tr><td>2010/0204907 A1*</td><td>8/2010</td><td>Nakatani ............. F02D 13/0234<br>701/108</td></tr>
<tr><td>2010/0305832 A1*</td><td>12/2010</td><td>Asano ................. F02D 13/0219<br>701/103</td></tr>
<tr><td>2011/0077838 A1</td><td>3/2011</td><td>Osburn et al.</td></tr>
<tr><td>2011/0191010 A1*</td><td>8/2011</td><td>Russ ..................... F02M 26/00<br>701/108</td></tr>
<tr><td>2016/0090929 A1*</td><td>3/2016</td><td>Tanaka ................... F02D 41/12<br>123/406.52</td></tr>
<tr><td>2016/0169186 A1*</td><td>6/2016</td><td>Stroh .................... F02P 5/1516<br>123/406.48</td></tr>
</table>

FOREIGN PATENT DOCUMENTS

<table>
<tr><td>JP</td><td>2005-146960 A</td><td>6/2005</td><td></td></tr>
<tr><td>JP</td><td>2007-192157 A</td><td>8/2007</td><td></td></tr>
<tr><td>JP</td><td>2007-315230 A</td><td>12/2007</td><td></td></tr>
<tr><td>JP</td><td>2008-150957 A</td><td>7/2008</td><td></td></tr>
<tr><td>JP</td><td>2008-208801 A</td><td>9/2008</td><td></td></tr>
<tr><td>JP</td><td>2009-041485 A</td><td>2/2009</td><td></td></tr>
<tr><td>JP</td><td>2009-167868 A</td><td>7/2009</td><td></td></tr>
<tr><td>JP</td><td>2010-001795 A</td><td>1/2010</td><td></td></tr>
<tr><td>WO</td><td>WO-2007/136142 A1</td><td>11/2007</td><td></td></tr>
<tr><td>WO</td><td>WO 2008/152491 A1</td><td>12/2008</td><td></td></tr>
<tr><td>WO</td><td>WO 2008152491 A1 *</td><td>12/2008</td><td>......... F02D 13/0203</td></tr>
</table>

\* cited by examiner

CONTROL DEVICE AND CONTROL METHOD OF INTERNAL COMBUSTION ENGINE

TECHNICAL FIELD

The present invention relates to a control apparatus for an internal combustion engine and a control method therefor in which a part of exhaust gas is re-circulated toward an upstream side of a turbo charger.

BACKGROUND ART

A technique to improve an exhaust performance of an internal combustion engine and to improve a fuel consumption of the internal combustion engine by introducing exhaust gas to an intake system in accordance with an driving state, viz., by performing, so-called, an EGR is conventionally known.

In addition, a structure such that, when the EGR is performed, a part of exhaust gas is re-circulated toward an upstream side of a compressor of a turbocharger disposed in an intake passage is conventionally known.

For example, a Patent Document 1 describes such a technique that, when a driving state is switched to a state in which an EGR gas quantity introduced from an upstream side of a compressor of the turbocharger disposed in an intake passage is increased more than the present time, an internal EGR is increased by modifying a valve timing by means of a variable valve timing mechanism and an insufficient quantity of an external EGR is compensated by the internal EGR at a transient time of the switching.

However, this Patent Document 1 does not specifically disclose at which timing a valve timing to increase the internal EGR is ended, when the variable valve timing mechanism is used to increase the internal EGR. Therefore, for example, when the valve timing such that the internal EGR compensates for the insufficient quantity of the external EGR rate within a cylinder is ended after the EGR rate within the cylinder has reached to the target value, there is a possibility that the EGR rate within the cylinder overshoots or undershoots with respect to the target value of the EGR rate within the cylinder due to an operation delay of the variably valve operated mechanism.

PRE-PUBLISHED DOCUMENT

Patent Document 1: Japanese Patent Application First Publication (tokkai) No. 2008-150957

DISCLOSURE OF THE INVENTION

Therefore, a control apparatus for an internal combustion engine according to the present invention comprises EGR rate predicting means for anticipating and predicting a variation of an EGR rate within a cylinder of the internal combustion engine developed due to a modification of an opening angle of an EGR control valve and a valve timing control device which is modifiable a valve timing of an engine valve, wherein the valve timing control device is controlled on a basis of a prediction by the EGR rate predicting means and an internal EGR gas quantity is adjusted in order for the EGR rate within the cylinder to become a target EGR rate.

According to the present invention, in a case where the opening angle of the EGR control valve is modified, the EGR rate within the cylinder of the internal combustion engine can accurately follow the target EGR rate. Thus, a worsening of driveability can be avoided.

EMBODIMENTS FOR CARRYING OUT THE INVENTION

Figure 1:
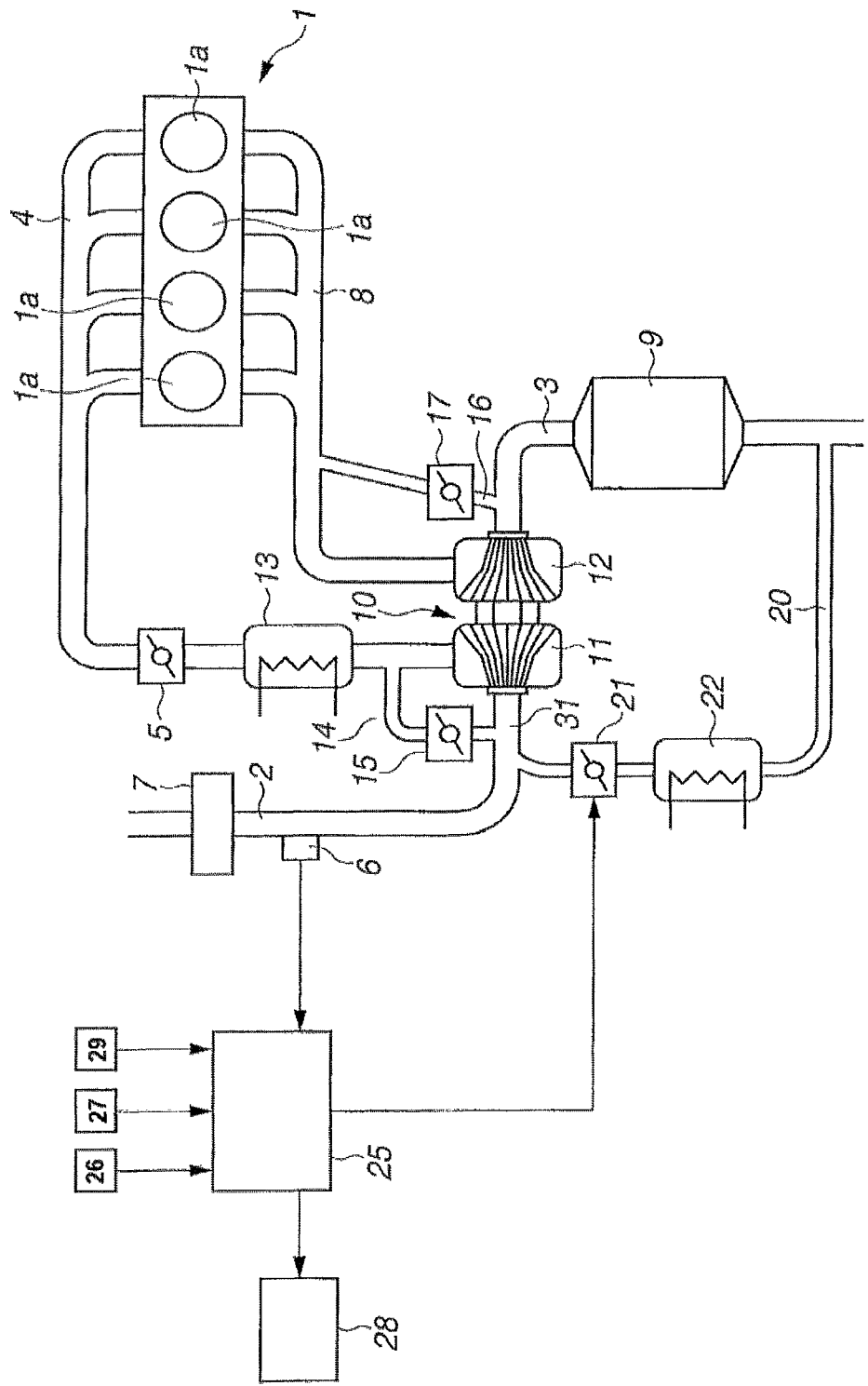
FIG. 1 is a system configuration view representing a whole structure of a control apparatus for an internal combustion engine according to the present invention.

Hereinafter, a preferred embodiment according to the present invention will be described in details on a basis of the drawings. FIG. 1 shows a system configuration view representing a whole structure of a control apparatus for an internal combustion engine according to the present invention.

An internal combustion engine 1 is mounted in a vehicle such as an automotive vehicle as a driving source. Each cylinder 1a of internal combustion engine 1 is connected to an intake passage 2 and an exhaust passage 3. An electrically controlled throttle valve 5 which is driven by means of an electrically driven motor is disposed in intake passage 2 connected to internal combustion engine 1 via an intake collector 4a and an intake manifold 4b. An airflow meter 6 which detects an intake air quantity and an air cleaner 7 are disposed at an upstream side of throttle valve 5. An exhaust catalyst 9 such as a three-way catalyst is disposed in exhaust passage 3 connected to internal combustion engine 1 via an exhaust manifold 8 for purifying exhaust gas.

In addition, a turbo charger 10 is disposed in this internal combustion engine 1. Turbo charger 10 has a coaxial shaft on which a compressor 11 disposed in intake passage 2 and a turbine 12 disposed on exhaust passage 3 are equipped. Compressor 11 is located at a more upstream side than throttle valve 5 and is located at a more downstream side than airflow meter 6. Turbine 12 is located at a more upstream side than exhaust catalyst 9. It should be noted that a reference numeral 13 in FIG. 1 denotes an intercooler disposed at the upstream side of throttle valve 5.

A re-circulation passage 14 is connected with intake passage 2 which bypasses compressor 11 to connect between the upstream side of compressor 11 and the downstream side of compressor 11. An electrically controlled re-circulation valve 15 is intervened in the re-circulation passage for controlling an intake air quantity within re-circulation passage 14. Re-circulation valve 15 is driven by means of an electrically driven motor. It should be noted that it is possible to use a, so-called, check valve which opens only when a pressure at the downstream side of compressor 11 is equal to or higher than a predetermined pressure.

An exhaust bypass passage 16 is disposed in exhaust passage 3 bypassing turbine 12 to connect between the downstream side and the upstream side of turbine 12. An electrically controlled waste gate valve 17 is intervened in exhaust bypass passage 16 which controls an exhaust gas flow quantity of exhaust bypass passage 16. Waste gate valve 17 is driven by means of the electrically driven motor. Therefore, in a turbo charge region, an opening angle of a waste gate valve 17 is adjusted so that a turbo charge pressure is controllable and the intake air quantity can be controlled in accordance with the opening angle of waste gate valve 17.

In addition, internal combustion engine 1 can carry out an exhaust (gas) re-circulation (EGR). An EGR passage 20 is disposed between exhaust passage 3 and intake passage 2. One end of EGR passage 20 is connected to exhaust passage 3 at a position of a downstream side of exhaust catalyst 9 and the other end of EGR passage 20 is connected to intake passage 2 at a position of the upstream side of compressor 11. An EGR control valve 21 and an EGR cooler 22 are intervened in this EGR passage 20. This EGR control valve 21 is driven by means of the electrically driven motor. The opening angle of EGR control valve 21 is controlled by means of a control unit 25 so as to achieve a target EGR rate which accords with a driving condition.

Control unit 25 inputs detection signals of sensors such as the detection signal of above-described airflow meter 6, crank angle sensor 26 detecting a crank angle of a crankshaft (not shown), an accelerator opening angle sensor 27 detecting a depression quantity of an accelerator pedal (not shown), and so forth.

Control unit 25 carries out the controls such as an ignition timing and an air-fuel ratio of internal combustion engine 1 and carries out an exhaust gas re-circulation control (EGR control) in which an opening angle of EGR control valve 21 is controlled so that part of exhaust gas is re-circulated from exhaust passage 3 to intake passage 2.

In addition, control unit 25 controls opening angles of throttle valve 5, re-circulation valve 15, and waste gate valve 17 in accordance with a driving condition.

Then, in the turbo charge region, the opening angle of throttle valve 5 is fully open and the opening angle of waste gate valve 17 is controlled so that a fresh air required to realize an engine demanded (required) torque is supplied to each cylinder of the engine. In a non-turbo charge region, the opening angle of waste gate valve 17 provides a predetermined constant angle and the opening angle of throttle valve 5 is controlled to supply fresh air required to achieve the engine demanded torque within the respective cylinders. That is to say, in the turbo charge region, waste gate valve 17 controls the intake air quantity and, in the non-turbo charge region, throttle valve 5 controls the intake air quantity.

In addition, in this embodiment, a valve operated mechanism driving each of intake valves (not shown) of internal combustion engine 1 is a variably operated valve mechanism 28 as a valve timing control device which is modifiable a valve timing of each of the intake valves (the valve timing of the intake valve). Various types of variably operated valve mechanism 28 are known. In this embodiment, one of the types in which a center angle of a working angle (open and closure interval of time) of each of the intake valves is continuously retarded or advanced to permit a modification of the open interval of each of the intake valves. This variably operated valve mechanism 28 is controlled by means of control unit 25. The modification of an open timing of each of the intake valves (of the intake valve) enables a variation of a valve overlap quantity in which an open interval of each of the intake valves (intake valve) is overlapped on the open interval of each of exhaust valves (of an exhaust valve) (not shown).

It should be noted that the EGR rate within each of the cylinders (the cylinder) is determined by an external EGR introduced by the valve open of EGR control valve 21 and an internal EGR (a residual gas quantity within the cylinder) according to the valve overlap between the intake valve and the exhaust valve. In this embodiment, for convenience, a rate of the external EGR with respect to all gases at an arbitrary position of an intake system is assumed to be an external EGR rate, a rate of the internal EGR with respect to all gases within each of the cylinders (within the cylinder) is assumed to be an internal EGR rate, and a sum of the external EGR rate within each of the cylinders (within the cylinder) and the internal EGR rate within each of the cylinders (within the cylinder) is assumed to be a total EGR rate within each of the cylinders (within the cylinder) (an total EGR rate within each of the cylinders (within the cylinder)).

In this embodiment, in a case where the EGR is carried out, the external EGR is mainly introduced in a high load state and the internal EGR is mainly introduced in a low load state. In other words, in a case where the EGR is carried out in the high load state, the opening angle of EGR control valve 21 is relatively increased and the valve overlap quantity between the intake valve and the exhaust valve is relatively decreased. In addition, in a case where the EGR is carried out in the low load state, the opening angle of EGR control valve 21 is relatively increased and the overlap quantity between the intake valve and the exhausted valve is relatively increased.

In such internal combustion engine 1 as described above, for example, in a case where the driving state is switched from the high load state to the low load state in the non-turbo charge region and the external EGR is stopped, EGR control valve 21 adjusting the external EGR is closed and the valve overlap quantity between the intake valve and the exhaust valve adjusting the internal EGR is controlled to be relatively large.

Figure 2:
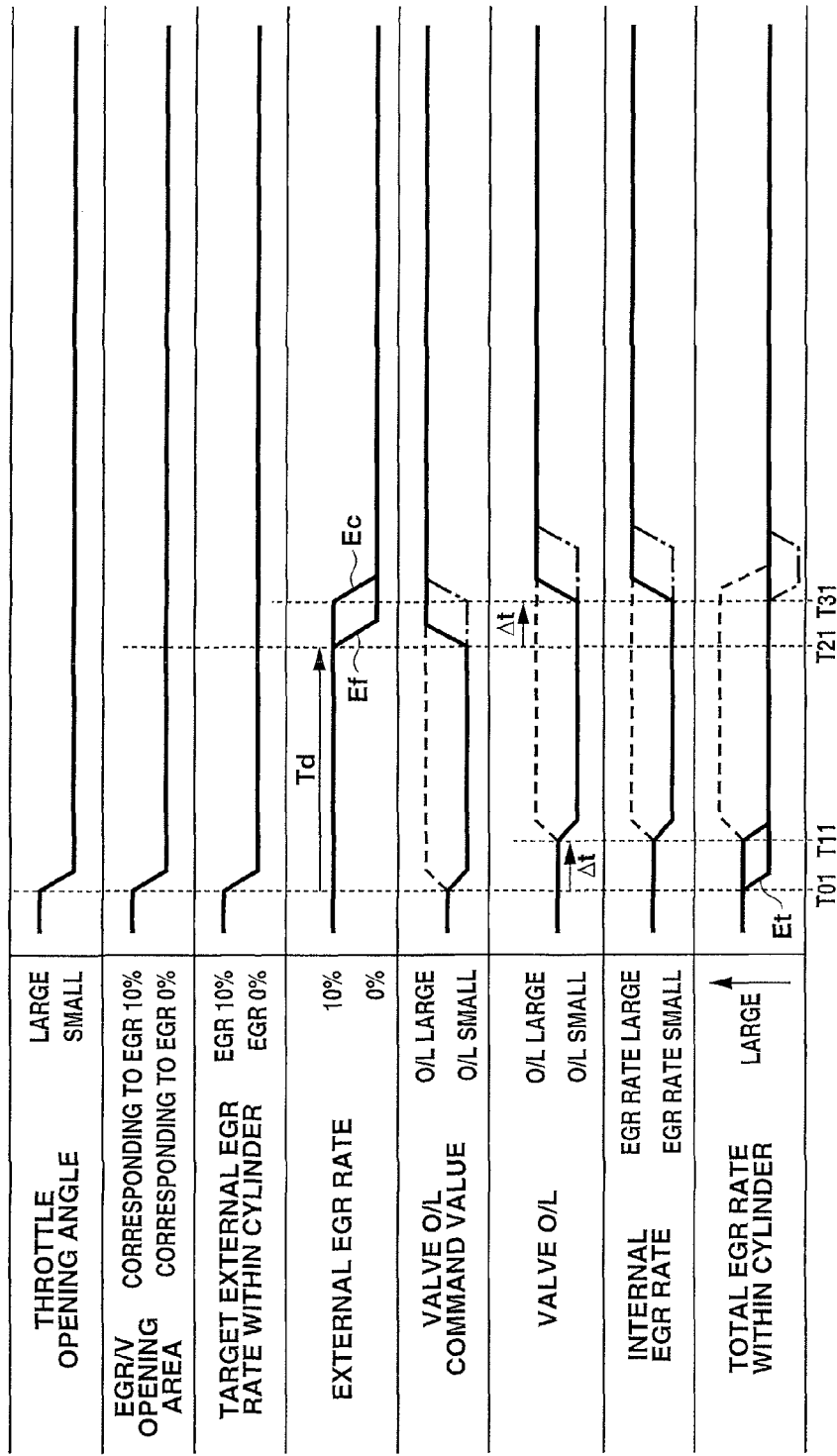
FIG. 2 is a timing chart representing a situation when an external EGR is stopped.

However, as shown in a characteristic line Ec in FIG. 2, a response delay occurs from a time at which the opening angle of EGR control valve 21 is modified to a time at which the variation in the external EGR rate within the cylinder actually appears. Therefore, as shown in a broken line in FIG. 2, when a target value (a command value) of variably operated valve mechanism 28 is modified so that the valve overlap between the intake valve and the exhaust valve is expanded (namely set to a target valve overlap quantity in the low load state) at a timing T01 at which EGR control valve 21 is closed, the internal EGR rate within the cylinder is varied (increased) before the external EGR rate is varied (decreased). Thus, the total EGR rate within the cylinder transiently largely exceeds the target EGR rate.

In addition, as shown in a dot-and-dash line in FIG. 2, the target value (or the command value) of variably operated valve mechanism 28 is modified to a low load transient time provisional value at which the valve overlap quantity between the intake valve and the exhaust valve is smaller than the present valve overlap quantity, at timing T01 at which the opening angle of EGR control valve 21 is modified, and is modified from the low load transient time provisional value to the target value at the time of the low load state, at a timing T31 at which the variation of the external EGR rate within the cylinder appears from the time at which the opening angle of EGR control valve 21 is modified. Thus, it can be suppressed that the total EGR rate within the cylinder transiently largely exceeds the target EGR rate after the modification of the opening angle of EGR control valve 21. However, variably operated valve mechanism 28 provides a response delay from a time at which the target value is modified to a time at which the valve open timing of the intake valve is actually started to be varied (a timing of T11 at which the valve open timing of the intake valve is started to be varied). Hence, the variation (increase)

of the internal EGR rate within the cylinder does not follow the variation (decrease) of the external EGR within the cylinder after a timing T31 at which the variation of the external EGR rate within the cylinder appears. Thus, the total EGR rate within the cylinder is transiently largely below the target EGR rate. It should be noted that the low load transient time provisional value is set so that the total EGR rate within the cylinder is not larger than the target EGR rate in a case where EGR control valve 21 is closed and provides a value smaller than the valve overlap quantity when EGR control valve 21 is closed.

It should be noted that the low load transient time provisional value is set so that the total EGR rate within the cylinder is not larger than the target EGR rate in a case where EGR control valve 21 is closed and is smaller than the valve overlap quantity when EGR control valve 21 is closed.

In a case where, for example, the driving state is switched from the high load to the low load in the non-turbo charge region and the external EGR is stopped, as denoted by a solid line in FIG. 2, at timing T01 at which the opening angle of throttle valve 5 is made small and EGR control valve 21 is closed, the valve overlap quantity between the intake valve and the exhaust valve is not modified to the target value at the time of low load but, as the above-described low load transient time provisional value, the valve overlap between the intake valve and the exhaust valve is once controlled in a direction which is contracted. Thus, it can be suppressed that the total EGR rate transiently largely exceeds the target EGR rate after the modification of the opening angle of EGR control valve 21.

The EGR rate at a predetermined position of the intake system at which the EGR rate is varied is reflected on the control of variable valve operated mechanism 28 at a timing T21 which is preceded by a response time Δt (a time duration from a time at which the target value of variably operated valve mechanism 28 is modified to a time at which the open timing of the intake valve is actually varied so that the valve overlap quantity between the intake valve and the exhaust valve is started to be varied) of variably operated mechanism 28 from timing T31 at which the external EGR rate within the cylinder is varied due to the modification of the opening angle of EGR control valve. In other words, at timing T21 at which the external EGR rate at the predetermined position is varied due to the valve closure of EGR control valve 21, the target value of the valve overlap quantity between the intake valve and the exhaust valve is modified from the above-described low load transient time provisional value to the target value at the time of the low load.

Thus, the variation (increase) of the internal EGR within the cylinder can follow the variation (decrease) of the external EGR rate within the cylinder. It can be suppressed that the total EGR rate within the cylinder is transiently largely below the target EGR rate. Consequently, a worsening of the driveability can be avoided.

The EGR rate at the above-described predetermined position is estimated, forexample, on a basis of the intake air quantity, the EGR rate at a junction section 31 between EGR passage 20 and intake passage 2, and a volume of a flow passage from EGR control valve 21 to the above-described predetermined position. It should be noted that the EGR rate at the above-described position may directly be detected by means of a sensor 29.

It should be noted that the above-described predetermined position is a position prescribed in accordance with specifications of the intake system. In addition, a characteristic line Ef in FIG. 2 indicates a variation of an estimated EGR rate at the above-described predetermined position. A characteristic line Et in FIG. 2 indicates the target value of the total EGR rate within the cylinder.

A delay time Td is predicted from a time at which the opening angle of EGR control valve 21 is modified to a time at which the EGR rate at the above-described predetermined position is started to be varied. After a passage of this delay time Td, the target value of the valve overlap quantity between the intake valve and the exhaust valve is modified from the above-described low load transient time provisional value to the target value at the time of the low load state. At this time, the variation (increase) of internal EGR rate within the cylinder can follow the variation (decrease) of the external EGR rate within the cylinder. This delay time Td can be estimated on a basis of, for example, the intake air quantity and a volume of a flow passage from EGR control valve 21 to the above-described predetermined position.

On the other hand, in such internal combustion engine 1 as described above, in a case where, in the non-turbo charge region, the external EGR is, for example, started from a state in which the driving state is switched from the low load to the high load and the external EGR is stopped, EGR control valve 21 adjusting the external EGR is opened and the valve overlap quantity between the intake valve and the exhaust valve adjusting the internal EGR is controlled to be relatively small.

Figure 3:
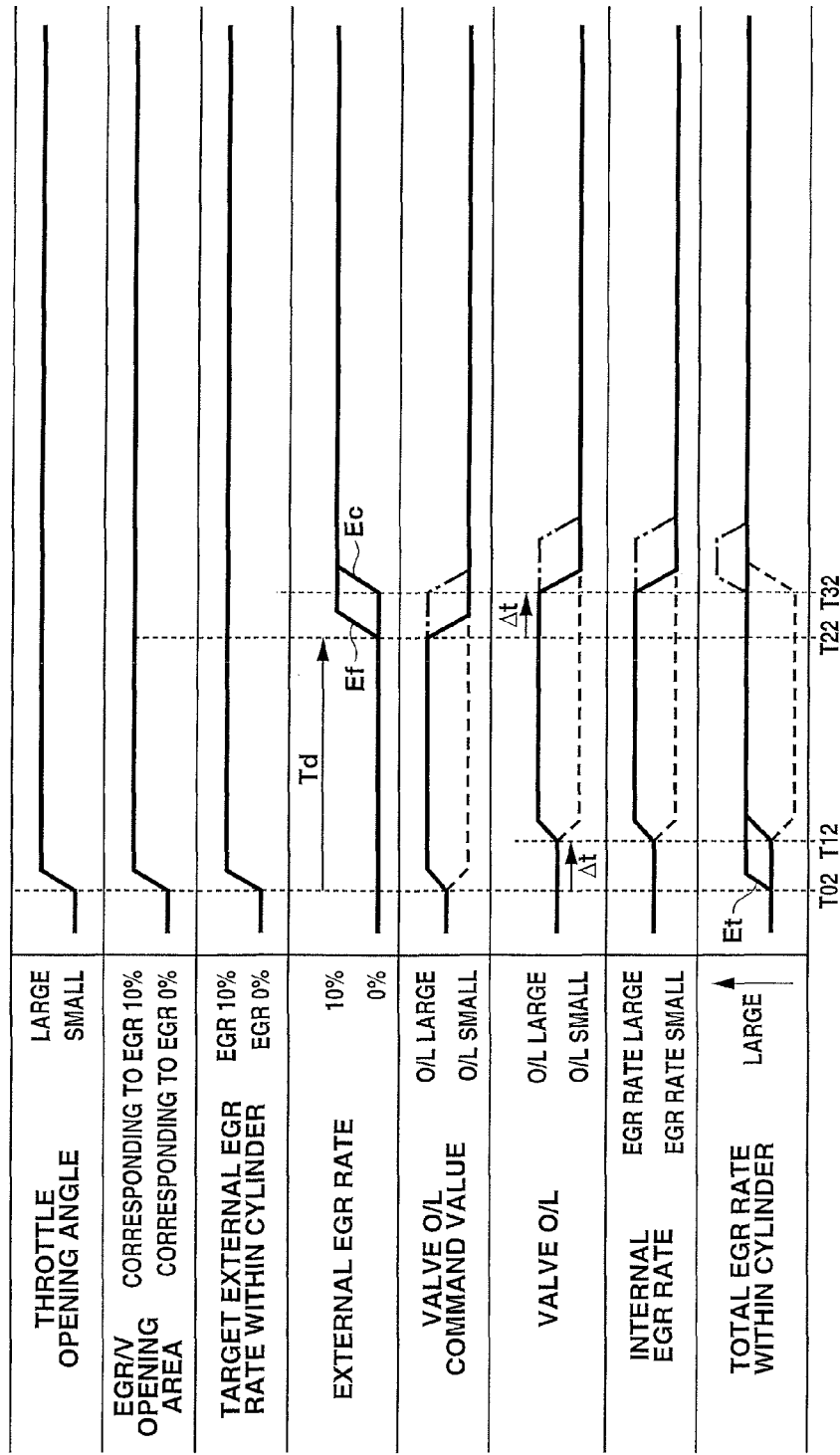
FIG. 3 is a timing chart representing a situation when the external EGR is started.

However, as shown by characteristic line Ec in FIG. 3, a response delay occurs from a time at which the opening angle of EGR control valve 21 is modified to a time at which the variation in the external EGR rate within the cylinder actually appears. Therefore, as shown by a broken line in FIG. 3, at a timing T02 at which EGR control valve 21 is valve opened, the target value (command value) of variably operated valve mechanism 28 is modified in such a way that the valve overlap between the intake valve and the exhaust valve is contracted (is set to be the target valve overlap quantity at the time of the high load). In this case, the internal EGR rate within the cylinder is varied (decreased) before the external EGR rate within the cylinder is varied (increased) so that the total EGR rate within the cylinder is transiently largely below the target EGR rate. It should be noted that a characteristic line Ef in FIG. 3 indicates the variation of the estimated EGR rate at the above-described predetermined position. A characteristic line Et in FIG. 3 indicates the target value of the total EGR rate within the cylinder.

In addition, as denoted by a dot-and-dash line in FIG. 3, at timing T02 at which the opening angle of EGR control valve 21 is modified, the target value (the command value) of variably operated valve mechanism 28 is modified to a high load transient time provisional value at which the valve overlap quantity between the intake valve and the exhaust valve is larger than the present valve overlap quantity and is further modified from the high load transient time provisional value to the target value at the time of high load at a timing T32 at which the variation in the external EGR rate within the cylinder appears from the time at which the opening angle of EGR control valve 21 is modified. In this case, it can be suppressed that the total EGR rate within the cylinder is largely below the target EGR rate after the modification of the opening angle of EGR control valve 21. However, as described above, an operation of variably operated valve mechanism 28 has the response delay (a timing T12 at which the open timing of the intake valve is started to be varied). Hence, after a timing T32 at which the variation in the external EGR rate within the cylinder appears, the internal EGR rate within the cylinder, the variation (decrease) of the internal EGR rate within the cylinder cannot follow the variation (increase) of the external EGR rate within the cylinder so that the total EGR rate within the cylinder transiently exceeds the target EGR rate. It should be noted that the high load transient time provisional value is set so that the total EGR rate within the cylinder is not smaller than the target EGR rate in a case where the EGR control valve 21 is opened and is a value larger than the valve overlap quantity when EGR control valve 21 is valve opened.

Thus, for example, in a case where, in the non-turbo charge region, the driving state is switched from the low load to the high load and the external EGR is started, as denoted by the solid line in FIG. 3, the opening angle of throttle valve 5 is increased and, at timing T02 at which EGR control valve 21 is valve opened, the valve overlap quantity between the intake valve and the exhaust valve is not modified to the target value at the high load state but is controlled in a direction in which the valve overlap between the intake valve and the exhaust valve is once expanded as the above-described high load transient time provisional value. Thus, it can be suppressed that the total EGR rate within the cylinder is transiently largely below the target EGR rate after the modification of the opening angle of EGR control valve 21.

Then, the EGR rate at the above-described predetermined position in which the EGR rate is varied at a timing T22 preceded from timing T32 at which the external EGR rate within the cylinder is varied due to the modification of the opening angle of EGR valve 21 by response time Δt of variably operated valve mechanism 28 is reflected on the control of variably operated valve mechanism 28. In other words, the target value of the valve overlap quantity between the intake valve and the exhaust valve is modified from the above-described high load transient time provisional value to the target value at the time of the high load at timing T22 at which the external EGR rate at the above-described predetermined position is varied in response to the valve open of EGR control value.

Thus, the variation (decrease) of the internal EGR rate within the cylinder can follow the variation (increase) of the external EGR rate within the cylinder. Thus, it can be suppressed that the total EGR rate within the cylinder transiently largely exceeds the target EGR rate. The worsening of driveability can, consequently, be avoided.

It should be noted that delay time Td from the time at which the opening angle of EGR control valve 21 is modified to a time at which the EGR rate is started to be varied at the above-described predetermined position is predicted and, after a passage of this delay time Td, the target value of the valve overlap quantity between the intake valve and the exhaust valve is modified from the above-described high load transient time provisional value to the target value at the time of the high load. In this case, the variation in the internal EGR rate within the cylinder can follow the variation of the external EGR rate within the cylinder.

In addition, in a case where above-described response time Δt of variably operated valve mechanism 28 is varied, the above-described predetermined position may be modified in accordance with this response time Δt. For example, in a case where variably operated valve mechanism 28 is hydraulic pressure driven, a response speed of variably operated valve mechanism 28 is relatively delayed as an oil temperature or a cooling water temperature becomes lower. Hence, the above-described predetermined position may relatively be modified to be upstream side within the intake system.

Then, an adjustment of an internal EGR gas quantity by means of variably operated valve mechanism 28 is carried out within an operation enable (operable) range of variably operated valve mechanism 28. In a case where the target value of variably operated valve mechanism 28 requires a movement exceeding the above-described operation enable (operable) range, the adjustment of the internal EGR gas quantity is carried out with an operation limit of the above-described operation enable range as a limit. That is to say, in a case where the calculated target value of the variably operated valve mechanism 28 advances the open timing of the intake valve to a further advance angle than a most advance angle position, control unit 25 controls variably operated valve mechanism 28 in order for the open timing of the intake valve to the most advance angle position. In addition, in a case where the calculated target value of variably operated valve mechanism 28 retards the open timing of the intake valve to a further retardation angle side than a most retardation angle position, control unit 25 controls variably operated valve mechanism 28 in order for the open timing of the intake valve to be the most retardation angle position.

Figure 4:
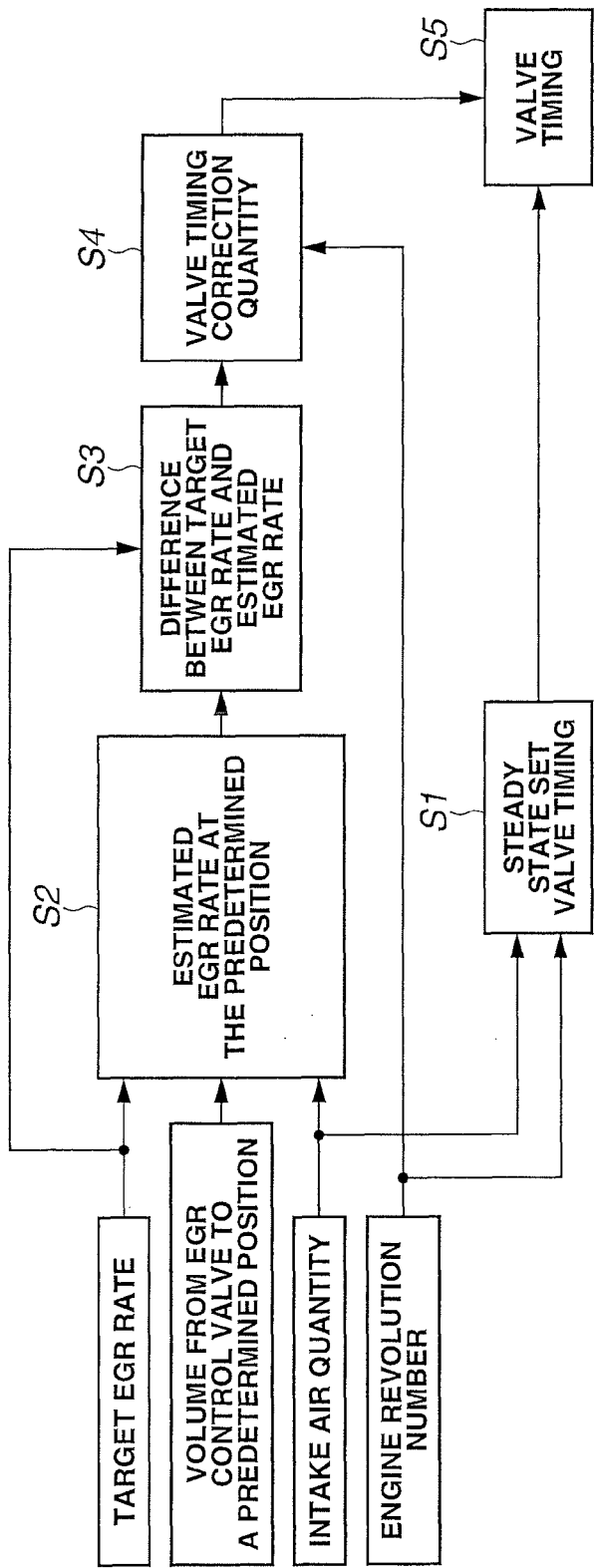
FIG. 4 is a block diagram representing a control content of a variable valve operating mechanism.

FIG. 4 is a block diagram representing a control content for variably operated valve mechanism 28 in this embodiment. At an S1, control unit 25 calculates a basic target value (the valve timing) of variably operated valve mechanism 28 in a steady state from an engine revolution number and the intake air quantity. At an S2, control unit 25 calculates the EGR rate at the above-described predetermined position of the intake system using the target EGR rate determined according to the driving condition, the intake air quantity, and the volume of the flow passage from the EGR control valve 21 to the predetermined position within the intake system.

At an S3, control unit 25 calculates a difference (a separation quantity) between the EGR rate calculated at S2 and the target EGR rate determined according to the driving condition. At an S4, control unit 25 calculates a valve timing correction quantity with respect to the target value in the steady state of variably operated valve mechanism 28 so that the EGR rate at the above-described predetermined position within the intake system becomes equal to the EGR rate calculated at S2 using the separation quantity calculated at S3 and the engine revolution number. At an S5, control unit 25 corrects the basic target value calculated at S1 by the valve timing correction quantity calculated at S4 and sets the corrected value as the target value of variably operated valve mechanism 28.

It should be noted that, in the above-described embodiment, only the operated valve mechanism for the intake valve side is the variably operated valve mechanism. However, the present invention is applicable to the variably operated valve mechanism which can modify the open timing of the exhaust valve by advancing or retarding a phase of a lift center angle of the exhaust valve (a phase with respect to a crankshaft (not shown)). In a case where the internal EGR is increased, the open timing of the intake valve is advanced by means of the variably operated valve mechanism for the intake valve side and the opening timing of the intake valve is advanced by means of the variably operated valve mechanism for the intake valve side and the closure timing of the exhaust valve is retarded by means of the variably operated valve mechanism for the exhaust valve side so that the valve overlap between the intake valve and exhaust valve may be increased. As the variably operated valve mechanism for the intake valve side and the variably operated valve mechanism for the exhaust valve side may be the variably operated valve mechanism which can simultaneously and continuously expand or contract both of a lift quantity and a working angle of the intake valve or the exhaust valve.

In addition, in the above-described embodiment, the valve timing control device in a case of the non-turbo charge time has been described. However, in the case of the non-turbo charge time, when the opening angle of EGR control valve 21 is modified, variably operated valve mechanism 28 is controlled which is the valve timing control device in the same way as the non-turbo charge time. Thus, the variation of the internal EGR rate within the cylinder can follow the variation of the external EGR rate within the cylinder and a large separation of the total EGR rate within the cylinder from the target value can be suppressed.

The invention claimed is:

1. A control apparatus for an internal combustion engine, comprising:
    a turbo charger located at an upstream side of a throttle valve;
    an exhaust gas re-circulation (EGR) passage through which a portion of exhaust gas is re-circulated to a portion of an intake passage which is at an upstream side with respect to the turbo charger;
    an EGR control valve disposed midway through the EGR passage;
    a control unit configured to determine a variation of an EGR rate within a cylinder of the internal combustion engine developed by a modification of an opening angle of the EGR, control valve; and
    a variably operated valve mechanism that modifies a valve timing of an engine valve,
    wherein the variably operated valve mechanism is controlled by the control unit based on the determination of the EGR rate variation by the control unit and an internal EGR gas quantity is adjusted in order for the EGR rate within the cylinder to become a target EGR rate,
    wherein the control unit determines an EGR rate at a predetermined position of an intake system which is at a downstream side with respect to a junction section between the EGR passage and the intake passage and which is at an upstream side than with respect to the cylinder,
    wherein the variably operated valve mechanism is controlled based on the EGR rate at the predetermined position of the intake system,
    wherein the EGR rate at the predetermined position of the intake system is modified in accordance with a time duration from a time at which a target value of the variably operated valve mechanism is modified to a time at which the valve timing of the engine valve is varied, and
    wherein the control unit determines the variation of the EGR rate within the cylinder of the internal combustion engine by calculating the EGR rate at the predetermined position of the intake system using the target EGR rate determined according to an ermine driving condition, an intake air quantity, and a volume of a flow passage from the EGR control valve to the predetermined position of the intake system.

2. The control apparatus for the internal combustion engine as claimed in claim 1,
    wherein the control unit determines the EGR rate at the predetermined position of the intake system at which the EGR rate is varied at a timing earlier than a timing at which the EGR rate within the cylinder is varied due to a modification of the opening angle of the EGR control valve by a variably operated valve mechanism response time from the time at which the target value of the variably operated valve mechanism is modified to the time at which the valve timing of the engine valve is varied.

3. The control apparatus for the internal combustion engine as claimed in claim 1,
    wherein the predetermined position is modified to an upstream side within the intake system under a driving condition under which a time duration from a time at which the target value of the variably operated valve mechanism is modified to a time at which the valve timing of the engine valve is varied increases.

4. The control apparatus for the internal combustion engine as claimed in claim 1,
    wherein the variably operated valve mechanism modifies an open timing of an intake valve and, in a case where an internal EGR is increased, the open timing of the intake valve is advanced to increase a valve overlap between the intake valve and an exhaust valve and, in a case where the internal EGR is decreased, the open timing of the intake valve is retarded to decrease the valve overlap.

5. The control apparatus for an internal combustion engine as claimed in claim 1,
    wherein the variably operated valve mechanism modifies an open timing of an intake valve and a closure timing of an exhaust valve, wherein, in a case where an internal EGR is increased, the open timing of the intake valve is advanced and the closure timing of the exhaust valve is retarded to increase a valve overlap between the intake valve and the exhaust valve, and wherein, in a case where the internal EGR is decreased, the open timing of the intake valve is retarded and the closure timing of the exhaust valve is advanced to decrease the valve overlap.

6. The control apparatus for the internal combustion engine as claimed in claim 1,
    wherein the variably operated valve mechanism is hydraulic pressure driven and, under a driving condition under which an oil temperature or a cooling water temperature is low, a response speed of the variably operated valve mechanism is delayed.

7. The control apparatus for the internal combustion engine as claimed in claim 1, wherein the EGR rate at the predetermined position of the intake system is detected by a sensor which is capable of detecting the EGR rate.

8. The control apparatus for the internal combustion engine as claimed in claim 1,
    wherein an adjustment of the internal EGR gas quantity by the variably operated valve mechanism is carried out within an operable range of the variably operated value mechanism and, in a case where the target value of the variably operated value mechanism requires a movement exceeding the operable range of the variably operated value mechanism, the adjustment of the internal EGR gas quantity is carried out with an operation limit of the operable range as a limit.

9. A control apparatus for an internal combustion engine, comprising:
    a turbo charger located at an upstream side of a throttle valve;
    an exhaust gas re-circulation (EGR) passage through which a portion of exhaust gas is re-circulated to a portion of an intake passage which is at an upstream side with respect to the turbo charger;

an EGR control valve disposed midway through the EGR passage;

a control unit configured to determine a delay time from a time at which an opening angle of the EGR control valve is modified to a time at a time at which an EGR rate at a predetermined position of an intake system, which is at a downstream side with respect to a junction section between the EGR passage and the intake passage and which is at an upstream side with respect to the cylinder, is varied; and a variably operated value mechanism that modifies a valve timing of an engine valve, wherein an internal EGR gas quantity is adjusted by the control unit in order for the EGR rate within the cylinder to become a target EGR rate by modifying a target value of the variably operated value mechanism after a passage of the delay time from a time at which the opening angle of the EGR control valve is modified, wherein the EGR rate at the predetermined position of the intake system is modified in accordance with a time duration from a time at which the target value of the variably operated value mechanism is modified to a time at which the valve timing of the engine valve is varied, and wherein the control unit determines the delay time by estimating the EGR rate at the predetermined position of the intake system using the target EGR rate determined according to an engine driving condition, an intake air quantity, and a volume of a flow passage from the EGR control valve to the predetermined position of the intake system.

10. The control apparatus for the internal combustion engine as claimed in claim 9, wherein the control unit predicts the delay time from the time at which the opening angle of the EGR control valve is modified to the time at which the EGR rate is varied at the predetermined position of the intake system at which the EGR rate is varied at a timing earlier than a timing at which the EGR rate within the cylinder is varied due to a modification of the opening angle of the EGR control valve by the variably operated value mechanism from the time at which the target value of the variably operated value mechanism is modified to the time at which the valve timing of the engine valve is varied, wherein, when the opening angle of the EGR control valve is modified, the target value of the variably operated value mechanism is modified after a passage of the delay time from the time at which the opening angle of the EGR control valve is modified.

11. The control apparatus for the internal combustion engine as claimed in claim 9, wherein the EGR rate at the predetermined position of the intake system is modified under a driving condition under which a time duration from the time at which the target value of the variably operated value mechanism is modified to a time at which the valve timing of the engine valve is varied increases.

12. A control method for an internal combustion engine, comprising:

determining a variation of an exhaust gas recirculation (EGR) rate within a cylinder of the internal combustion engine developed due to a modification of an opening angle of an EGR control valve disposed in an EGR passage through which a portion of exhaust gas is re-circulated to a portion of an intake passage which is at an upstream side with respect to a turbo charger positioned at an upstream side of a throttle valve;

controlling a variably operated valve mechanism that modifies a valve timing of an engine valve based on the prediction of the EGR rate variation; and adjusting an internal EGR gas quantity in order for the EGR rate within the cylinder to become a target EGR rate;

determining an EGR rate at a predetermined position of an intake system which is at a downstream side with respect to a junction section between the EGR passage and the intake passage and which is at an upstream side with respect to the cylinder;

controlling the variably operated valve mechanism based on the EGR rate at the predetermined position of the intake system; and modifying the predetermined position in accordance with a time duration from a time at which a target value of the variably operated valve mechanism is modified to a time at which the valve timing of the engine valve is varied.

* * * * *